United States Patent [19]

Haese

[11] 4,268,489

[45] May 19, 1981

[54] PROCESS FOR THE REMOVAL OF SULFUR DIOXIDE FROM GASES

[75] Inventor: Egon Haese, Bochum, Fed. Rep. of Germany

[73] Assignees: Dr. C. Otto & Comp. GmbH, Bochum, Fed. Rep. of Germany; Sidmar N.V., Ghent, Belgium

[21] Appl. No.: 939,718

[22] Filed: Sep. 5, 1978

[30] Foreign Application Priority Data

Sep. 13, 1977 [DE] Fed. Rep. of Germany ....... 2741116

[51] Int. Cl.³ ............................................. C01B 17/00
[52] U.S. Cl. ................................... 423/242; 423/545
[58] Field of Search .......... 423/242 R, 242 A, 244 A, 423/244 R, 545, 547

[56] References Cited

U.S. PATENT DOCUMENTS

| | | | |
|---|---|---|---|
| 2,021,558 | 11/1935 | Lee et al. | 423/242 X |
| 2,233,841 | 3/1941 | Lepsoe | 423/242X |
| 2,862,789 | 12/1958 | Burgess | 423/242 X |
| 3,943,228 | 3/1976 | Dezael et al. | 423/242 X |
| 4,151,263 | 4/1979 | Ciuryla et al. | 423/242 |

*Primary Examiner*—O. R. Vertiz
*Assistant Examiner*—Gregory A. Heller
*Attorney, Agent, or Firm*—Thomas H. Murray; Clifford A. Poff

[57] ABSTRACT

A process is provided for treating exhaust gases to remove sulfur dioxide by contacting the gas with a solution of ammonium sulfite and bisulfite in a scrubber. A portion of the solution discharged from the scrubber is oxidized to form ammonium sulfate and the treated gas is further treated with the oxidized solution.

3 Claims, 1 Drawing Figure

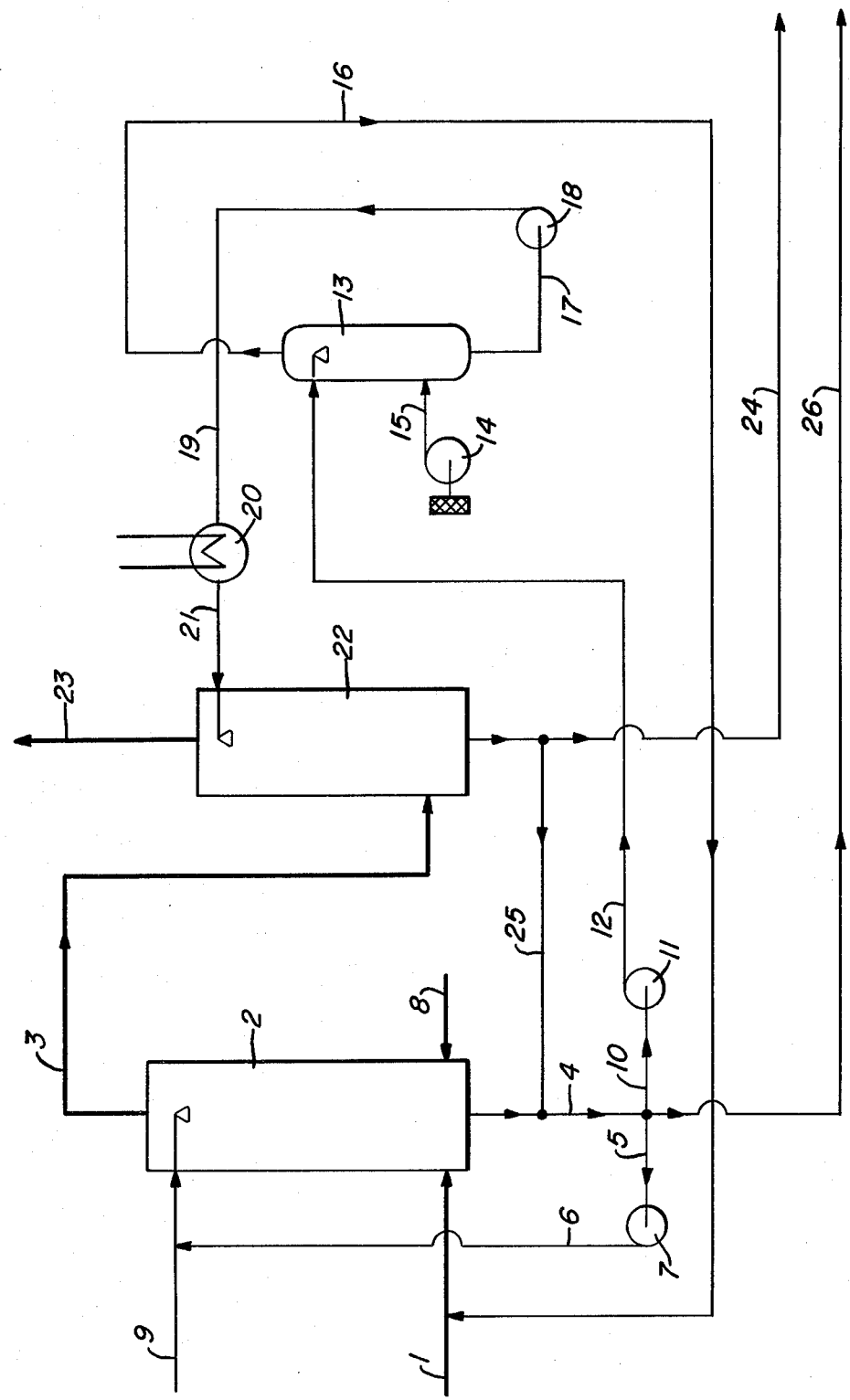

PROCESS FOR THE REMOVAL OF SULFUR DIOXIDE FROM GASES

BACKGROUND OF THE INVENTION

The present invention relates to a process for the removal of sulfur dioxide from gases, especially industrial exhaust gases, in which the gases are treated with ammonia or ammonia-containing solutions in a scrubber.

Most of the recently developed processes of this kind which utilize ammonia for removal of sulfur dioxide from gases employ a washing solution which consists of ammonium sulfite and ammonium bisulfite dissolved in water. The ammonium sulfite reacts with the sulfur dioxide in the gas to form the bisulfite according to the following equation:

$$(NH_4)_2SO_3 + SO_2 + H_2O \rightarrow 2NH_4HSO_3 \qquad (1)$$

The ammonia used in this way can be replaced, for example, by adding ammonium hydroxide which forms ammonium sulfite according to the following equation:

$$2NH_4OH + SO_2 \rightarrow (NH_4)_2SO_3 + H_2O \qquad (2)$$

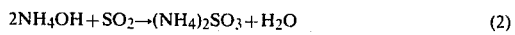

Other known processes for the removal of sulfur dioxide use gaseous ammonia which is fed into the gas to be cleaned in a scrubbing tower or before entering the tower. This also results in the formation of sulfite and bisulfite in the washing solution. The content of ammonium sulfate resulting from these processes is usually quite small.

In another process which also uses gaseous ammonia for the removal of sulfur dioxide, the ammonia is mixed in the form of a mist with the gas to be treated. In this way, extensive oxidation to the sulfate is achieved with the free oxygen present in the gas. This reaction is dependent on temperature, however, and at low operating temperatures, such as below 40° C., the sulfite content still amounts to about 20%, by weight, of the total salt content of the solution.

It is known from the literature that the vapor pressures of sulfur dioxide and of ammonia over an ammonium sulfite-bisulfite solution depend on the temperature, the concentration, and the ratio of S/C, where S is the total concentration of $SO_2$ in the solution and C is the total concentration of $NH_3$ in the solution. The effect of this is that in the known processes discussed above, there is a substantial vapor pressure of ammonia in the last or so-called $SO_2$ scrubber. If no special separation equipment is provided to recover the ammonia, this results in loss of the ammonia thus evaporated from the solution, which prohibitively increases the cost.

Many known processes, therefore, use an additional scrubbing step in which the ammonia, and necessarily also sulfur dioxide, are washed out of the solution with water. If the water introduced into the process in this way is later evaporated by the sensible heat of the hot exhaust gases being treated, the resulting increases in the density, the dew point and the mass of the gas have undesirable effects for the following compressor and the stack. The wash water used in such cases must also be fully demineralized to prevent contamination and breakdowns. The processes disclosed in published German patent applications OS No. 24 31 130 and OS No. 25 18 386 use expensive ion-exchange apparatus for this purpose.

It is also known in the art to use a very dilute solution of ammonium sulfite and bisulfite for further scrubbing of previously-treated gas. In this way, loss of ammonia is reduced by making use of the fact that the vapor pressure of ammonia is almost proportional to the concentration C. The process described in the published German patent application OS No. 24 29 690 uses for this purpose a scrubbing solution having a salt content less than 0.015 mol per liter with additional washing water. The used solution discharged after the scrubbing process is separated from the sulfite in an electrodialyzer and can be reused.

Both of these last-mentioned types of processes involve the disadvantage that substantial investment is necessary for preparation of the washing solution, and they lose the advantage of displacement of the dew point which results from the absence of boiling of the concentrated salt solution. If concentrated salt solutions are used, the dew point of the gases discharged from the apparatus lies below the gas temperature.

SUMMARY OF THE INVENTION

The purpose of the present invention is to provide a process for removing sulfur dioxide from gases which avoids the disadvantages of the known processes discussed above. In particular, loss of ammonia is substantially prevented, and the use of expensive equipment for further scrubbing of the gas after treatment is avoided.

In a process of the kind initially described, the invention involves drawing off a small part of the circulating solution of ammonium sulfite and bisulfite, oxidizing this diverted stream with oxygen, air or other oxidizing medium to form ammonium sulfate, and further treating the previously-scrubbed gas with this oxidized solution. The oxidized solution should be adjusted to a pH value in the range of 4 to 6, preferably 4.5 to 5. In the preferred embodiment of the invention, the oxidized solution contains from 20% to 50%, by weight, of dissolved ammonia salts, preferably 30% to 45% while the dew point of the gases discharged from the second scrubber lies below the gas temperature. Since the sulfate formed by oxidation has practically no vapor pressure and the pH value of the solution is low, ammonia is completely separated from the gas and remains in the solution. This ammonia-carrying solution discharged from the second scrubber can be returned to the system for recirculation and by removal of some of the solution as a product, a given sulfate level can be maintained.

It is, however, also possible to draw off all of the fully-oxidized ammonium sulfate-containing solution as a product. For this purpose, the use of a multi-stage scrubber with recirculation has proved satisfactory for attaining an adequate flow. This mode of operation would, therefore, be used if ammonium sulfate is to be produced.

The invention will be more fully understood from the following detailed description, taken in connection with the accompanying drawing, in which the single figure shows schematically a process for desulfurizing gas in which ammonia is used for the removal of sulfur dioxide.

The gas to be treated is introduced through a line 1 into the lower part of a scrubber 2 and is discharged through a line 3 after removal of $SO_2$. Most of the washing solution discharged from the bottom of the scrubber 2 is returned to the top of the scrubber through lines 4, 5 and 6 by means of a pump 7. The washing solution contains ammonium sulfite and ammonium bisulfite and is brought into intimate contact with the gas to be treated in the scrubber 2, so that the reactions corresponding to Equations (1) and (2) take place. Ammonia can be introduced into the system either in a gaseous form through the line 8 or in the form of an ammonium hydroxide solution through the line 9.

A part of the solution discharged from the sump of the scrubber 2 is diverted through the line 10, pump 11 and line 12 to an oxidizer 13. The quantity thus diverted should be not less than an amount corresponding to the known minimum acceptable flow rate for the particular type of tower 13 to be used. The diverted solution is oxidized in the oxidizer 13 by means of air, oxygen or other oxidizing medium to form ammonium sulfate. In the illustrative example, air is introduced into the lower part of the oxidizer 13 by a compressor 14 through a line 15. The oxidizer 13 may be of any suitable type and may, for example, be a scrubber or a gas bubble type of apparatus.

The exhaust air discharged from the oxidizer 13 is returned through the line 16 to the gas to be treated, to avoid any loss of ammonia. The oxidized solution flows through the line 17, pump 18, line 19, cooler 20, and line 21 to the top of a second scrubber 22 to which gas from the scrubber 2 flows through the line 3 for further treatment. The purified gas is finally discharged from the second scrubber 22 through the line 23 at a temperature which lies above the dew point.

The solution discharged from the scrubber 22 can be either withdrawn through the line 24 if ammonium sulfate is the desired product, or it can be returned to the system through the line 25 for recirculation. In the latter mode of operation, excess solution can be discharged through the line 26 to maintain the desired level of sulfur in the solution. The excess solution is, of course, itself a useful product.

A process is thus provided for removal of sulfur dioxide from exhaust gases which prevents any loss of ammonia, since all ammonia removed from the system is recovered as ammonium sulfate. The gas to be cleaned is discharged free of sulfur dioxide and at a temperature above the dew point, so that no expensive additional treatment is required.

I claim as my invention:

1. A process for the removal of sulfur dioxide from exhaust gases comprising (a) treating said gases in a scrubber with a solution containing ammonium sulfite and ammonium bisulfite to absorb said sulfur dioxide, (b) drawing off a portion of said solution, (c) oxidizing said portion of the solution to form ammonium sulfate, and (d) further treating the gas with the oxidized solution while maintaining the dew point of said further treated gas beneath the temperature of the gas; whereby the escape of ammonia in the further treating process is prevented.

2. A process as defined in claim 1 in which said oxidized solution has a pH in the range of 4 to 6.

3. A process as defined in claim 2 in which said oxidized solution contains from 20% to 50% by weight of dissolved ammonia salts.

* * * * *